United States Patent
Fleming et al.

(10) Patent No.: US 10,319,051 B2
(45) Date of Patent: Jun. 11, 2019

(54) SYSTEM AND METHOD FOR CREATING AND MANAGING INTELLIGENT WATER POINTS IN RESOURCE CONSTRAINED REGIONS

(71) Applicant: INTERNATIONAL BUSINESS MACHINES CORPORATION, Armonk, NY (US)

(72) Inventors: Kala Fleming, Nairobi (KE); Muuo Wambua, Nairobi (KE); Timothy Kotin, Accra (GH); Elizabeth Ondula, Nairobi (KE); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 15/070,163

(22) Filed: Mar. 15, 2016

(65) Prior Publication Data

US 2017/0270621 A1    Sep. 21, 2017

(51) Int. Cl.
*G06Q 10/06*    (2012.01)
*G06Q 50/06*    (2012.01)

(52) U.S. Cl.
CPC ......... *G06Q 50/06* (2013.01); *G06Q 10/0635* (2013.01)

(58) Field of Classification Search
CPC ............................... G06Q 10/06; G06Q 50/06
USPC ........................................................ 705/7.28
See application file for complete search history.

(56) References Cited

U.S. PATENT DOCUMENTS

| | | | |
|---|---|---|---|
| 7,031,927 B1 | 4/2006 | Beck et al. | |
| 8,583,386 B2 | 11/2013 | Armon et al. | |
| 8,655,595 B1* | 2/2014 | Green | G06Q 90/00 702/5 |
| 2007/0012628 A1* | 1/2007 | Frank | C02F 1/008 210/668 |
| 2010/0023442 A1* | 1/2010 | O'Hara | G06Q 40/00 705/37 |
| 2013/0110399 A1* | 5/2013 | Moss | G01W 1/10 702/3 |
| 2014/0180761 A1* | 6/2014 | Yolles | G06Q 10/06311 705/7.29 |
| 2016/0057949 A1* | 3/2016 | Williams | A01G 25/167 700/284 |
| 2016/0063402 A1* | 3/2016 | Webb | G06Q 10/067 705/348 |
| 2016/0232621 A1* | 8/2016 | Ethington | G06Q 10/06315 |
| 2017/0053360 A1* | 2/2017 | Loeb | G06Q 50/06 |

FOREIGN PATENT DOCUMENTS

| | | |
|---|---|---|
| JP | 2001215119 A | 8/2001 |
| JP | 2013061252 A | 4/2013 |

* cited by examiner

*Primary Examiner* — Nga B Nguyen
(74) *Attorney, Agent, or Firm* — Eyal Gilboa; Andrew M. Calderon; Roberts Mlotkowski Safran Cole & Calderon, P.C.

(57) ABSTRACT

The disclosure provides a system and method for collection of water point data from a distribution of water points to generate a digital aquifer. The disclosure includes a system to generate and collect water point data through devices supported by frugal innovations that address resource constraints. Use of the systems and methods as described enable water point users to better plan and manage limited water resources.

20 Claims, 4 Drawing Sheets

(12) United States Patent

SYSTEM AND METHOD FOR CREATING AND MANAGING INTELLIGENT WATER POINTS IN RESOURCE CONSTRAINED REGIONS

FIELD OF THE INVENTION

In embodiments, the technical field of the invention is in water resource management systems and methods, as well as water resource modelling systems and methods.

BACKGROUND

Water scarcity in an increasingly uncertain world can have a huge impact on businesses and individuals. Significant effects include loss of economic opportunity and time. Such effects can influence an individual, residential homes, food and entertainment, catering, restaurants, gyms, real estate, facilities management, apartment owners, commercial and industrial businesses, insurance, among others. Other effects include: reduction on farm productivity, thereby affecting agri-business; ill health, thereby impacting hospitals and schools; and poor hygiene. Moreover, the risk of not having water can have wider and far reaching impacts.

Water scarcity risks trigger more chronic impacts in resource-constrained regions like Africa. Water scarcity manifests a range of risks that have varying levels of importance to different end users and consumer. Both individual behavior (water usage) and the external context (supply reliability) determine water scarcity risk. Individual behavior may mitigate or exacerbate water scarcity. For example, purchasing a water storage tank when supply is intermittent reduces the risk of suffering an economic loss from reduced or otherwise stopping crop productivity.

Variability is introduced in the external context via factors such as: management competency and infrastructure insufficiency leading to intermittent supply from municipal piped water systems; variable population growth via uncontrolled urbanization; recharge potential of the natural groundwater system; and rainfall variability in timing and intensity. Such factors greatly complicate the water usage, leading to uncertainty among the stakeholders.

It is desirable to make use of the growing deployment of Internet connected devices and machines (such as the Internet of Things (IoT)), embedded devices, sensors, applications, and middleware in the area of water usage. Allowing distributed devices to instrument water points, creating digital aquifers, digital lakes, digital rivers, etc.

Water points have long been instrumented or monitored and analysed, manually, to determine availability and quality of water resources. However, the impact to businesses and individuals caused by the unpredictability and reliability of water supply remains unmonitored and unknown.

SUMMARY OF THE INVENTION

In an aspect is a computer system, comprising: a processor; and a memory coupled to the processor, the memory configured to store program instructions executable by the processor to cause the computer system to: receive water point data from a water point sensor about a water point remotely located with respect to the computer system, and store the received water point data in a water point data hub; receive secondary data from a secondary data source and store the received secondary data in the water point data hub; correlate the secondary data with the water point data; generate a water risk score vector from the water point data hub; and generate a notification based on the water risk score vector. In embodiments:

the computer system is further configured to generate signals and/or alerts (in addition to or in the alternative to a notification) based on the water risk score vector;

the water point data hub is a Digital Aquifer;

the computer system is further configured to generate a water point forecast for the water point from the water point data hub, and use the water point forecast to generate the water risk score vector;

the computer system is further configured to receive water point data from a plurality of distributed water point sensors about a plurality of distributed water points each remotely located with respect to the computer system;

the computer system is further configured to receive secondary data from a plurality of secondary data sources and store the received secondary data in the water point data hub;

the computer system is further configured to aggregate the secondary data;

the computer system is further configured to interlink the secondary data with metadata;

the water point data hub comprises data received from a plurality of water points, and wherein the water point forecast is part of a digital aquifer model, wherein the method further comprises generating a water point forecast for the water point from the water point data hub;

the water point data hub comprises data received from a plurality of water points, and wherein the water point forecast is part of a digital aquifer model, wherein the method further comprises generating a longitudinal time series water point forecasts for the water point from the updated water point data hub;

the computer system is further configured to receive water point data from a plurality of water point sensors about a plurality of water points each remotely located with respect to the computer system;

the computer system is further configured to receive continuous water point data from a plurality of water point sensors about a plurality of water points each remotely located with respect to the computer system;

a prioritization or optimization function (or algorithm) is applied to de-prioritize the notification based on the water risk score vector and predetermined business needs;

wherein prioritization and optimization functions are applied to de-prioritize or re-prioritize the notification based on the water risk score values and predetermined or computed business needs;

the water point data hub is an interlinked database configured to store historical water point data from a plurality of water points, and the interlinkage is with additional data sources such as demography, ground water models, environmental data, etc.;

the notification is selected from prioritized alert, signal and/or notification pools and is communicated via a plurality of channels to initiate online and offline services;

the notification is selected from prioritized alert pools and is communicated with various channels (e.g., SMS, email, screen alert, intra-program message, etc.) for various online and offline services (e.g. water requisition order and signal for cyber-physical controlling depending on the severity level of the alert or signal);

the secondary data source is a sensor, a social media network, a website, a manual input device, or a secondary database, and wherein the secondary data is selected from a weather report, a receipt, a social media interaction, a mobile app, a water 'logbook' entry, a website usage report, a health report, a news feed, and a news report;

the secondary data is correlated with the water point data based on a correlation factor selected from a time factor and a location factor;

the secondary data is aggregated, interlinked (with metadata) and correlated with the water point data based on a correlation factor selected from a time factor and a location factor the water point gathering sensor is a device, camera, water meter, or motion sensor;

the water point data is selected from a water level, a water usage rate, and a water quality;

the water risk score vector may result in consumption rate/pattern, water level, forecasted water point, etc., and is generated using variables extracted from the water point analysis, contextual information and other external data sources, and provides predicted risk levels;

the water risk score vector is used to calculate the impact of not having access to water on a given time for a given business or user on a given context;

a notification manager/generator, impact accessor, distributor and/or a set of optimization algorithms may be used and depend on the value of risk score vector;

the water point data hub is a water resource that has been converted to data (such as a groundwater resource being converted to a Digit Aquifer) and allows operations (e.g., time-series analyses of water availability, time-series analyses on water usage, similarity of water points, etc.) requested by a consumer with a determined level of specificity based on time and space, delivered in privacy-preserving manner;

the water point data hub is a Digital Aquifer and allows operations (e.g., time-series analyses of water availability, time-series analyses on water usage, similarity of water points, etc.) requested by a consumer with a determined level of specificity based on time and space, delivered in privacy-preserving manner;

the water point sensor is a component of a mobile device (e.g., cellular phone, etc.);

the secondary data is aligned with consumer-supplied metadata and context information;

the water point data hub is a Digital Aquifer and is progressively updated based on a plurality of consumer-specific data sources (wherein the consumer is selected from borehole holders, restaurants and companies, etc.);

the water point data hub is a water resource that has been converted to data and is progressively updated based on a plurality of consumer-specific data sources (wherein the consumer is selected from borehole holders, restaurants and companies, etc.);

the system further comprises a module that converts a water consumers required water quantities to marginal water loss values when the required water quantities are not supplied;

the water risk score is dynamically generated after comparing marginal water related costs incurred by consumer to marginal water supply cost (e.g., a low score approaching zero means negligible marginal water related costs would be incurred at the current water supply levels and no actions are required to reduce water scarcity and potential economic loss; a "high" score means there is a significant difference between the marginal water related impact costs and the cost of improving the water supply; to reduce the gap, the consumer must act to reduce water consumption levels or increase the water supply;

the water point forecast is generated from the water point data hub;

the water point sensor is coupled to an embedded unit configured to dynamically annotate and link the water point data with metadata values;

the metadata values are predefined and/or computed, and are optionally captured via sensors, mobile devices, or implicit or explicit user input;

the water point sensor is coupled to an embedded unit configured to dynamically annotate and link the water point data with metadata values, and wherein the metadata values are predefined or computed, and are optionally captured via sensors, mobile devices, or implicit or explicit user input;

the computer system is further configured to receive water point data from a plurality of water point sensors about a plurality of water points remotely located with respect to the computer system, and wherein the method further comprises generating a water point forecast for the water point from the water point data hub, and using the water point forecast to generate the water risk score vector; and the water point sensor is coupled to an embedded unit configured to dynamically annotate and link the water point data with metadata values, and wherein the computer system is further configured to receive water point data from a plurality of water point sensors about a plurality of water points remotely located with respect to the computer system.

In an aspect is a method comprising: receiving, by a computer system via a network, water point data from a water point sensor about a water point remotely located with respect to the computer system, and storing the received water point data in a water point data hub; receiving, by the computer system, secondary data from a secondary data source and storing the received secondary data in the water point data hub; correlating the secondary data with the water point data; generate a water risk score vector from the water point data hub; and generating a notification based on the water risk score vector. In embodiments:

the method further comprises generating a water point forecast for the water point based, at least in part, on the received water point data and received secondary data and using the water point forecast to generate the water risk score vector;

the water point data is dynamically annotated with predefined metadata values by an embedded unit;

the water point data is dynamically annotated with predefined or computed metadata values by an embedded unit;

the computer system is further configured to receive water point data from a plurality of distributed water point sensors about a plurality of distributed water points each remotely located with respect to the computer system, and wherein the method further comprises generating a water point forecast for the water point from the water point data hub, and using the water point forecast to generate the water risk score vector; and the water point sensor is coupled to an embedded unit configured to dynamically annotate and link the water point data with metadata values, and wherein the computer system is further configured to receive water point data from a plurality of water point sensors about a plurality of water points remotely located with respect to the computer system.

In an aspect is a system comprising: a processor; a memory coupled to the processor, the memory configured to store program instructions executable by the processor to carry out the method as above; and a water point sensor located remotely from the processor and in communication with the processor via a network. In embodiments:

the system further comprises a second water point sensor;

the system further comprises a network of a least two additional water point sensors each located remotely from the processor and in communication with the processor via a network; and the system comprises a plurality of distributed water point sensors each located remotely from the processor and in communication with the processor via a network.

In an aspect is a method comprising: receiving, by a computer system via a network, water point data from a water point sensor about a water point remotely located with respect to the computer system, and storing the received water point data in a water point data hub; receiving, by the computer system, secondary data from a secondary data source and storing the received secondary data in the water point data hub; correlating the secondary data with the water point data; and identifying a water risk from the water point data hub, the water risk exceeding a threshold risk, and generating a customized water risk signal configured to initiate a water risk mitigation step. In embodiments:

the threshold is a predetermined threshold that factors user needs (e.g., water usage both immediate and/or historical for the specific user and/or nearby users, etc.), supply situations (e.g., availability of nearby supply, quality of nearby supply, etc.), and the like;

the water risk signal is configured for transmission via a network (e.g., the Internet or a cellular network);

the water risk signal is an alert suitable for display on a monitor or is a signal suitable for initiating an automated process;

the water risk signal is configured to initiate a water risk mitigation step such as controlling cyber-physical systems in an Internet of Things (IoT) setting; and the water risk mitigation step is selected from a water delivery, a part delivery (e.g., for repair of a water pump or other water device), reduction in water usage, water purification (e.g., adding a purification chemical), and a repair of a water resource.

These and other aspects of the invention will be apparent to one of skill in the art from the description provided herein, including the examples and claims.

DETAILED DESCRIPTION OF VARIOUS EMBODIMENTS

Figure 1:
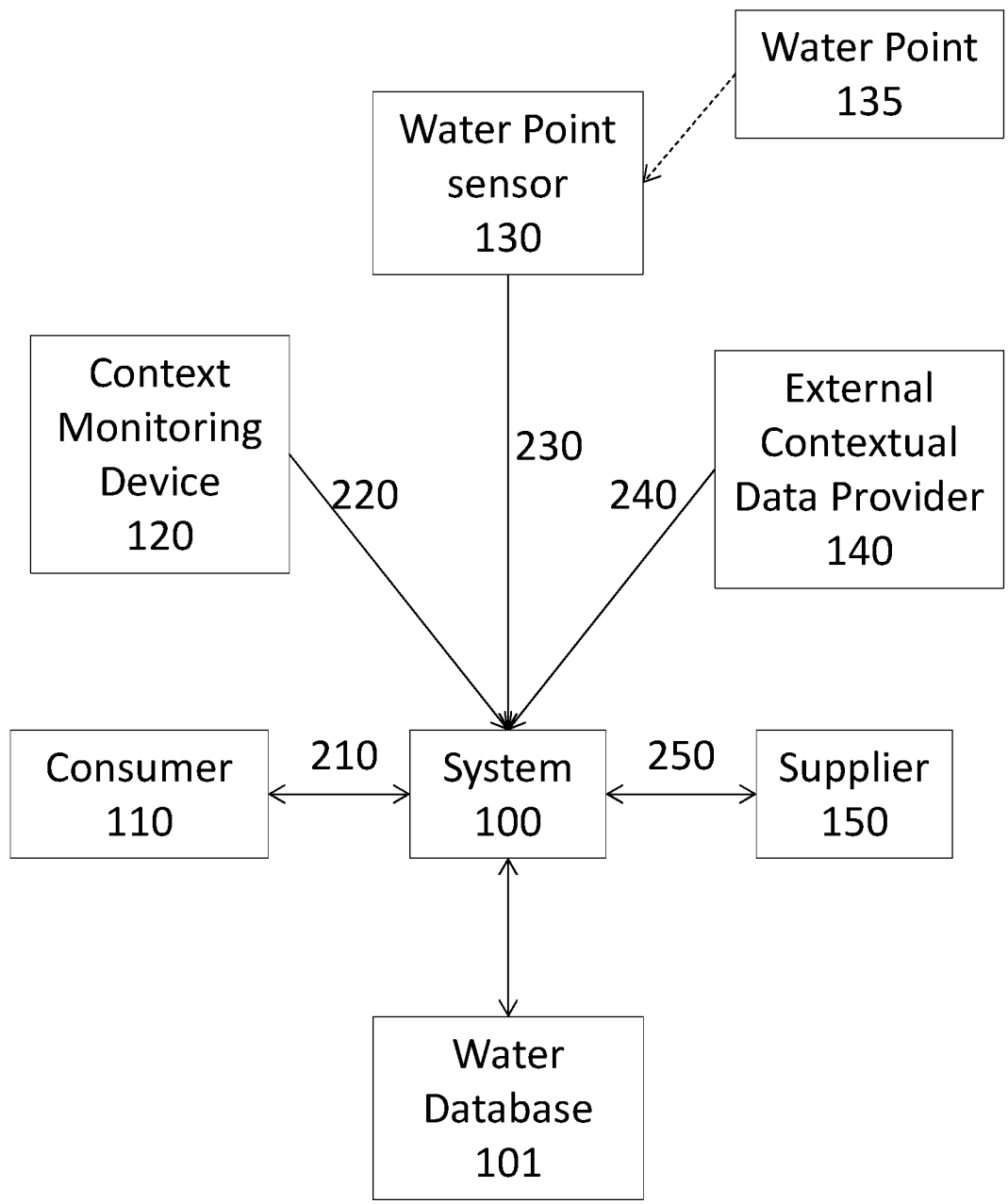
FIG. 1 provides a chart representing a computer system and the components with which the computer system interacts according to an embodiment of the disclosure.

In an aspect is a system and method for collection of water point data from a distribution of water points to generate a digital aquifer. The aspect includes a system to instrument and collect water points through devices (e.g., mobile sensors, etc. as described herein) supported by frugal innovations that address resource constraints (e.g. limited memory/storage, connectivity, unreliable power source). The system contains an embedded unit that dynamically annotates the water data with predefined metadata values (e.g., factors affecting water supply, as described herein) as captured through sensor/mobile devices. A novel digital aquifer representation that contains a wide-range of operations (e.g., time-series analyses of water availability, time-series analyses on water usage, similarity of water points, etc.) pertaining to water data supports consumer requests with a different level of specificity based on time and space, and may be delivered in a privacy-preserving manner.

In an aspect, is a system and method for distributed collection of consumer contextual data. The system include multiple units that extract, analyze and characterize consumer specific features from multiple consumer data sources (such as sale receipts, logbook, mobile apps, social media interactions, etc. as described herein), and then aligns with consumer-supplied metadata and context information. The system further comprises a module that progressively updates the digital aquifer based on a plurality of consumer-specific data sources and generates interlinked digital aquifer for water data consumers, e.g., borehole holders, restaurants and companies.

In an aspect is a system and method for generating water risk scores and prioritization. The system comprises a module that converts a water consumers required water quantities to marginal water loss values when the required water quantities are not supplied. The system further comprises a module that dynamically generates a water risk score after comparing marginal water related costs incurred by consumer to marginal water supply cost. A "low" score approaching zero means negligible marginal water related costs would be incurred at the current water supply levels and no actions are required to reduce water scarcity and potential economic loss. In contrast, a "high" score means there is a significant difference between the marginal water related impact costs and the cost of improving the water supply. To reduce the gap, the consumer must act to reduce water consumption levels or increase the water supply.

In an aspect is a system and method for forecasting and predicting water scarcity from the digital aquifer and context information based on water risk score vectors. The system comprises a module that anticipates future water usage based on the likely future context and related activities. Given likely future water use, a module may be progressively updating the digital aquifer comparing future water usage to available water supply.

In embodiments are the systems and methods as described herein, where the method of forecasting and predicting water scarcity needs to individual consumers further includes: an automatic alert system by employing various probabilistic algorithms to dynamically generate alters; enablement of automated order placement system; and intervention and recommendation strategies.

The systems mentioned herein are the first of their kind, for example by creating water loss impact curves in resource constrained environments through continuous collection of water points, individual behaviour and environmental and consumer related context data, continuous updating of the digital aquifer, and generation of analytical models and water risk scores to help individuals, business, or other consumers in making intelligent decisions, intelligent online/offline services to mitigate expected business risks, etc. The systems and methods are therefore applicable to individual homes, farms and other businesses, and entire communities, among other stakeholders.

With reference to FIG. 1, there is provided system 100. In embodiments, system 100 is a computer system that comprises a processor and memory coupled to the processor. The system 100 may also be referred to herein as a server, although the term "server" is not meant to be unduly limiting and may include, in embodiments, a traditional server, a desktop computer, a laptop or other mobile device, or any other suitable processor/memory system. In embodiments, system 100 is localized and self-contained, although in other embodiments system 100 may be delocalized in whole or in part, such as via cloud-based computing resources (e.g., cloud-based storage or processing). System 100 is in communication with, and may send/receive information via, one or more communication networks, such as the Internet, a cellular network, and the like.

System 100 can send and receive messages from consumer 110. In embodiments, consumer 110 is a consumer of water resources and may be selected from a business (e.g., restaurants, markets, hospitals, hotels, laundry services, farms, salons, pump vendors, car washes, agri-business, etc.) and an individual (e.g., a water point servicing a private household, smallholder farm, etc.). In one direction, communication 210 between system 100 and consumer 110 includes consumer contextual data being sent to system 100 for inclusion in the database and modelling. Such data may include consumption patterns, business volume, revenues, water dependence, and the like. It will be appreciated that "consumer contextual data" enables system 100 to have data about consumer behaviour, patterns, and activities. System 100 can also send information to consumer 110, as is described in more detail herein. Examples of such communications include alerts, recommendations, and order placement, as described herein.

System 100 further receives context monitoring data from context monitoring device 120. Context monitoring device 120 provides automated collection or capture of data from sources such as log books, sales receipts, calendars, etc., and may be embodied in mobile applications, desktop applications, and the like. Context monitoring device 120 may be a general purpose device such as, for example, a desktop computer, laptop, tablet, or cellular phone. Alternatively, context monitoring device 120 may be a dedicated device designed solely for recording and supplying context monitoring data to system 100. It will be appreciated that "context monitoring data" enables system 100 to have data about specific consumer activities (past and future), water usages and needs, and the like. Context monitoring device 120 communicates 220 via a network with system 100. The network may be, for example, the Internet or a cellular network, or some other convenient network. Communications (220) from context monitoring device 120 are typically one-way as shown in FIG. 1, although two-way communications are also possible where desirable.

System 100 further receives water point data from water point sensor 130. A water point sensor may be a dedicated sensor as such, specifically designed and deployed for the methods disclosed herein. Alternatively the water point sensor may be a dedicated device that is nominally for a different purpose but is configured to provide water point data according to the invention, such as a smart meter nominally used by a water utility company. Alternatively a water point sensor may be a multipurpose device that contains a sensor component, such as a computer. Water point sensor 130 communicates 230 via a network with system 100. The network may be, for example, the Internet or a cellular network, or some other convenient network. Communications (230) from water point sensor 130 are typically one-way as shown in FIG. 1, although two-way communications are also possible where desirable. Herein, a computer system is said to be in communication with a water point when that system is in communication with a water point sensor (or a device containing a water point sensor) that is monitoring the water point.

The water point data provided by water point sensor 130 is data pertaining to water point 135. A water point is a location at which water is stored, withdrawn, monitored, and/or treated. A variety of water points are possible. Examples include storage tanks, boreholes, standpipes, wells, and the like. The type of data that is provided as water point data will vary depending on the type of water point to which it pertains. Examples of water point data may include an instantaneous stored amount of water (e.g., a water level in a storage tank), a usage rate over time (e.g., an aggregate usage or a time-averaged usage from a tank or standpipe), a water quality, a replenishment rate, and the like. A single water point sensor may be used, where appropriate, to provide water point data for a plurality of water points, although typically a water point sensor will be dedicated to a single water point. The water point sensor may be embedded within the water point such as within a storage tank, or such as in-line with a water pipe, or inline with an exit or filling valve at a storage tank, or the like. Alternatively the water point sensor may be external to the water point and configured to sense event for the water point, such as an external sensor configured to track usage at a standpipe. In embodiments, water point sensor 130 and context monitoring device 120 measure/provide information pertaining to water point users of water point 135. Water point users include owners (e.g., a water storage tank at a restaurant or the like) as well as non-owner users (e.g., people withdrawing water from a community well or the like). Users may include human users as well as machine users or automated processes that withdraw, test, monitor, and/or modify (e.g., purify, treat, etc.) water at a water point.

System 100 further receives, via communication 240, external contextual data from External Contextual Data Provider 140. External contextual data may comprise any information pertaining to a water-relevant factor other than direct information about a water point and water point users. Examples of external contextual data includes weather data, utility price data, macro-economic trends, relevant incidents (e.g., significant leakage, sabotage or accidents, etc.), and the like. External Contextual Data Provider may be, then, a sensor, a website, a news aggregator or news provider, a camera, and the like. The format of such external contextual data may vary, and in some cases may need interpretation or reformatting in order to be appropriately processed by system 100. Apart from the raw data itself, important information to be obtained from external contextual data may include, for example, the relevant area/vicinity to which the data pertains, the time period for which the data is relevant, and the like. Acquisition of data from the External Contextual Data Provider may be automated such that the data is sent to System 100 on a periodic basis, or may be requested on-demand. External Contextual Data Provider 140 communicates 240 via a network with system 100. The network may be, for example, the Internet or a cellular network, or some other convenient network. Communications (240) from External Contextual Data Provider 140 are typically one-way as shown in FIG. 1, although two-way communications are also possible where desirable.

System 100 further obtains information (supplier data) from Supplier 150. Suppliers are entities (either individuals, companies, government, etc.) that supply water to a water point such as water point 135 or entities that maintain, manage, or own a water point. Examples of suppliers include private vendors, public utilities, and the like. The type of data provided by the supplier will vary depending, for example, on the identity of the supplier. Examples of supplier data include supply availability, proximity (e.g., a water tank truck location), reliability, price, and the like. Data from suppliers is communicated (250) to system 100 via a network. The network may be, for example, the Internet or a cellular network, or some other convenient network. Communications 250 from Supplier 150 may be two-way communications such that system 100 can send information and/or instructions to supplier 150. Such instructions can be sent in response to information provided by Supplier 150 or can be un-solicited communications based on other factors such as water point data. It will be appreciated that communications from system 100 to either the supplier 150 or the consumer 110 may be the notification described herein—i.e., such communication can be an instruction that initiates a water risk mitigation step.

All data received by system 100 is processed and stored in a water point data hub—i.e., a database containing water point data and usage information, represented in FIG. 1 as Water Database 101. Water Database 101 may be stored locally in a server memory (e.g., a single localized server may function as both System 100 and Water Database 101). Water Database 101 may alternatively be stored in a delocalized manner such as in a cloud storage medium, in which case Water Database 101 is in two-way communication with System 100 via a network such as the Internet or a cellular network.

A water point data hub such as Water Database 101 is, in embodiments, a digital model, also referred to as a Digital Aquifer Store or a Digital Aquifer, of the water point(s) that is/are in communication with System 100. As an example, a physical groundwater aquifer when converted to data becomes a Digital Aquifer that can be reimagined as a system for delivering groundwater management services. By simplifying re-creation of the physical aquifer on the cloud using disparate data sources from many organizations, the systems and method disclosed can capture the dynamics of human interactions with groundwater (illegal extraction, over extraction, inequitable distribution or water appropriation by certain individuals or businesses, etc.). The Digital Aquifer produces water scarcity risk scores that help governments, water utilities, agribusinesses and insurance companies understand their risk to operations. Furthermore, it gives more options to entities who have water but lack the capacity/capability to increase the value that groundwater delivers to the economy. It also increases visibility and market opportunities for services and infrastructure ecosystem—drillers, water delivery vendors, tank manufacturers, etc. The Digital Aquifer further allows users to dynamically monitor, measure, analyze, and communicate water-related information by applying analytics algorithms, as described herein. This provides powerful insights from ambient data and generates interlinked insights, thereby allowing improvements in decisions, activities, operational efficiencies, and business models.

Although FIG. 1 shows only one water point 135 and one water point sensor 130, any number of water points may be monitored by System 100 and therefore part of the Digital Aquifer, such as more than or equal to 1, 3, 5, 10, 15, 25, 50, 100, 500 or 1000 water points, or such as in the range 1-1000, or 1-500, or 5-1000, or 5-500, or 15-1000, or 15-500 water points.

Furthermore, Water Database 101 contains "secondary data"—this is data that is not water point data but is still relevant to the operations of water points and assists the methods and systems herein in providing more complete model such as a Digital Aquifer. Examples of secondary data include external contextual data (e.g., from external contextual data provider 140) and context monitoring data (e.g., from context monitoring device 120). Other forms of data that could be used as secondary data are also possible and can be identified, obtained, and processed as appropriate, provided that the data assists the systems/methods herein in developing an improved model of water points. The secondary data is added to and stored in the water point data hub, along with water point data. Secondary data may be provided by more than or equal to 1, 3, 5, 10, 15, 25, 50, 100, 500 or 1000 secondary data sources, or such as in the range 1-1000, or 1-500, or 5-1000, or 5-500, or 15-1000, or 15-500 secondary data sources.

The data contained in Water Database 101 may be, in some cases or all cases, annotated with selected metadata. Such metadata can be supplied by the various original sources of the data (e.g., a water point sensor or the like), or can be supplied by the computer system receiving the data, or a combination thereof. Examples of metadata include a time stamp, geo-location stamp, local weather report, population density, and the like.

In embodiments, secondary data (of any nature, whether from context monitoring devices, external contextual data providers, or other sources) is correlated with one or more relevant water point data also stored in Water Database 101. By correlated is meant that the secondary data is digitally linked due to a correlating factor such as time, space, or some other selected relevant factor. For example, secondary data that is weather data for a particular region may be correlated to any water points within that same region. Also for example, secondary data that is a logbook entry for a specific water point such as a restaurant may be correlated to the specific water point from which it was received.

Secondary data includes those types of data mentioned herein as well as a weather report, a receipt, a social media interaction, a mobile app, a water logbook entry, a website usage report, a health report, and a news report. Such data can be obtained from secondary data sources including those mentioned herein (context monitoring device, etc.) as well as a sensor, a social media network, a website, a manual input device, or a secondary database.

Figure 2:
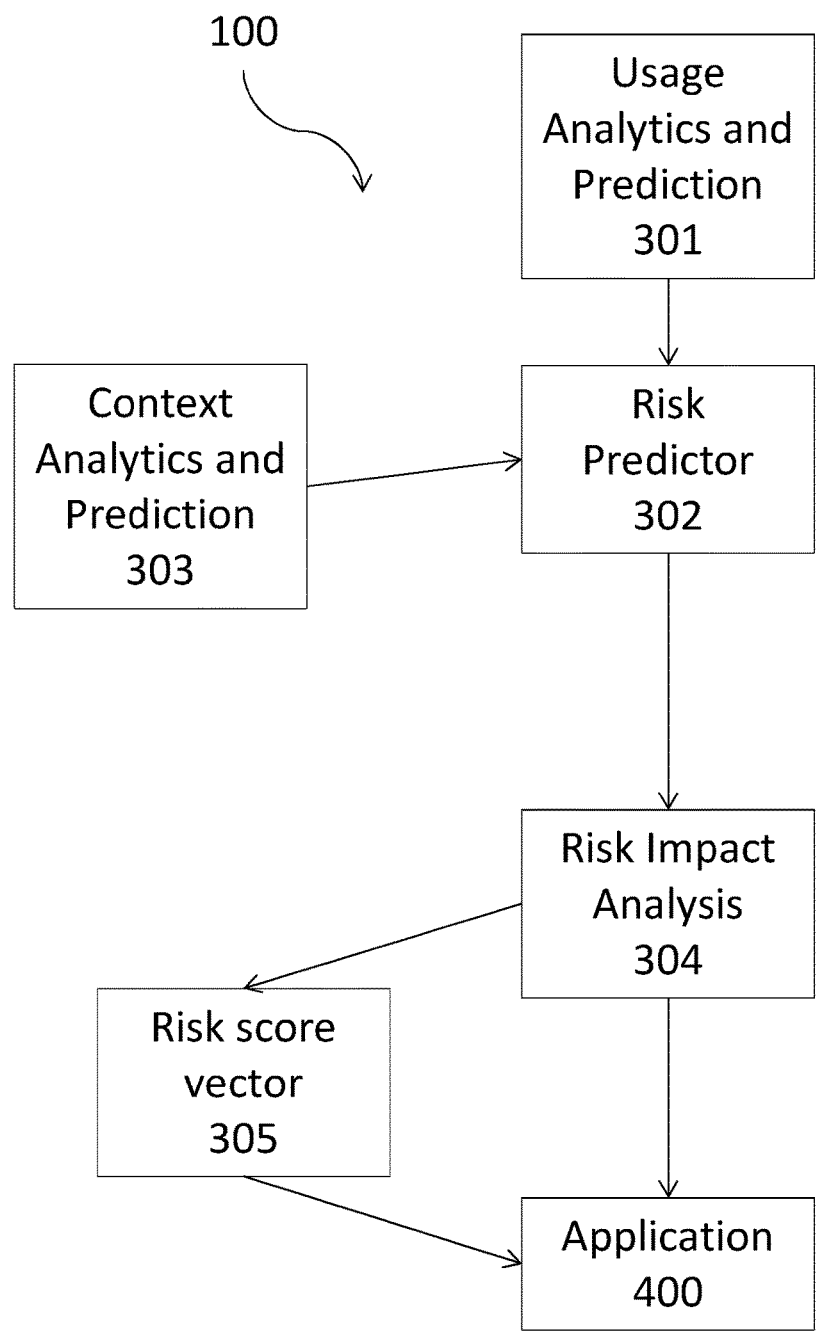
FIG. 2 provides a flow chart representing the computer system according to an embodiment of the disclosure.

Referring now to FIG. 2, the functions and interactions of System 100, a computer system according to an aspect of the invention, are shown. The system comprises a water database that is not shown in FIG. 2, but is accessed by the computer system in order to do certain of the calculations, predictions, and analytics that are described in the figure. It will be appreciated that a variety of modules are shown in FIG. 2. Such modules are neither exhaustive nor, in all cases, necessary. Furthermore, the various functions are shown as individual "modules" (also, herein, "system modules") and in embodiments, such functions will be separately identifiable portions of computer instructions and/or hardware. In some embodiments the various embodiments are carried out by the same processor/memory (or, alternatively by cloud-based processing and memory) and it may not be convenient or possible to identify separate hardware components for individual modules.

System 100 includes Usage Analytics and Prediction Module 301, which accesses the water data hub to provide analyses and predictions based on the data received and processed. The module uses known descriptive and predictive analytics algorithms. For example, using aggregated water level inputs or flow inputs the algorithms generate consumption profiling summarized hourly, daily, weekly or monthly consumption.

System 100 further includes Context Analytics and Prediction Module 303, which receives consumer contextual data and generate consumer behaviour, patterns, and time series analysis of consumer activities.

System 100 further includes Risk Predictor Module 302, which receives analyses and predictions from the Context Analytics and Prediction Module 303 as well as external contextual data. From such data, Risk Predictor Module 302 produces risk vectors.

System 100 further includes Risk Impact Analysis Module 304, which receives risk predictors from Risk Predictor Module 302. The Risk Predictor Module 302 (or an equivalent module) calculates the impact of the generated risk using Module 302 and, in embodiments, compare the water risk with a threshold risk. A water risk may include, for example: a risk of running low or completely out of water at a water point; an imbalance between supply and demand at a water point; a decrease (including an unacceptably dangerous decrease) in water purity; a water infrastructure malfunction (either present or potential) such as a leak at a water point or a faulty pump or the like, etc.

Risk Impact Analysis Module provides a variety of output, including a Risk Score Vector 305 (also referred to herein as a water risk score vector), as well as other outputs. For example, Risk Score Vector 305 may be compared to a threshold risk (input by a user or automatically determined), and where the computed risk score value exceeds the threshold outputs may include a signal (including an alert or instruction as described herein) to control connected devices (e.g. shutdown a node in the IoT, control water usage such as by opening or closing a valve, etc.), an event to initiate a service (e.g., to place automatic ordering), etc. In embodiments the signal calls another software program(s) based on the risk and the type of signal or event output of the Risk Impact Analysis Module.

In embodiments, Risk Impact Analysis Module 304 communicates output, including Risk Score Vector 305, to Application 400. Application 400 may be, for example, an application on System 100 that provides a user interface—i.e., direct communication with the user through System 100 (in which case Risk Score Vector 305 is more conveniently considered to be a signal). Alternatively or in addition, Application 400 may be an application on System 100 that communicates information via a network to a variety of user devices each having a user interface. Examples of such communications include short messages such as SMS messages on a cellular network, or alert messages via the Internet or a dedicated network.

The output of Risk Impact Analysis Module 304, which is sent to Application 400, include a notification and may include a variety of instructions that initiate processes. For example, alerts may be generated that initiate automated or manual (or combined automated/manual) processes, particularly water risk mitigation processes, such as a requisition, an intervention, or a notification. Requisitions include orders placed via an automatic order placement system or a manual order placement system, and may include orders for delivery of water, equipment (pumping equipment, additional storage equipment, etc.), purification chemicals, replacement parts, and the like. Interventions include orders for repairs of physical infrastructure, installation of additional equipment (storage tanks, pumps, piping, etc.), alterations of processes (e.g., changes in water purification methods or usage patterns), and the like. Notifications include the provision of information intended to assist various users and policy makers in decision-making processes. Examples include historical usage patterns, predictions of usage, shortages, surpluses, and/or water purity issues, and the like. Such output may be communicated to applications used by a variety of stakeholders include suppliers and users at water points.

Application 400 may be in two-way communication with such stakeholders (e.g., with an application on a device used by a stakeholder) so as to improve or modify the output based on further information received from such stakeholders. For example, Application 400 may communicate to a water supplier that a delivery is needed at a specific location, and the water supplier may indicate back (automatically or manually) their geo-location. Based on the received geo-location, Application 400 may decide to cancel the initial request and request water deliver from a different supplier that is closer to the delivery location.

Figure 3:
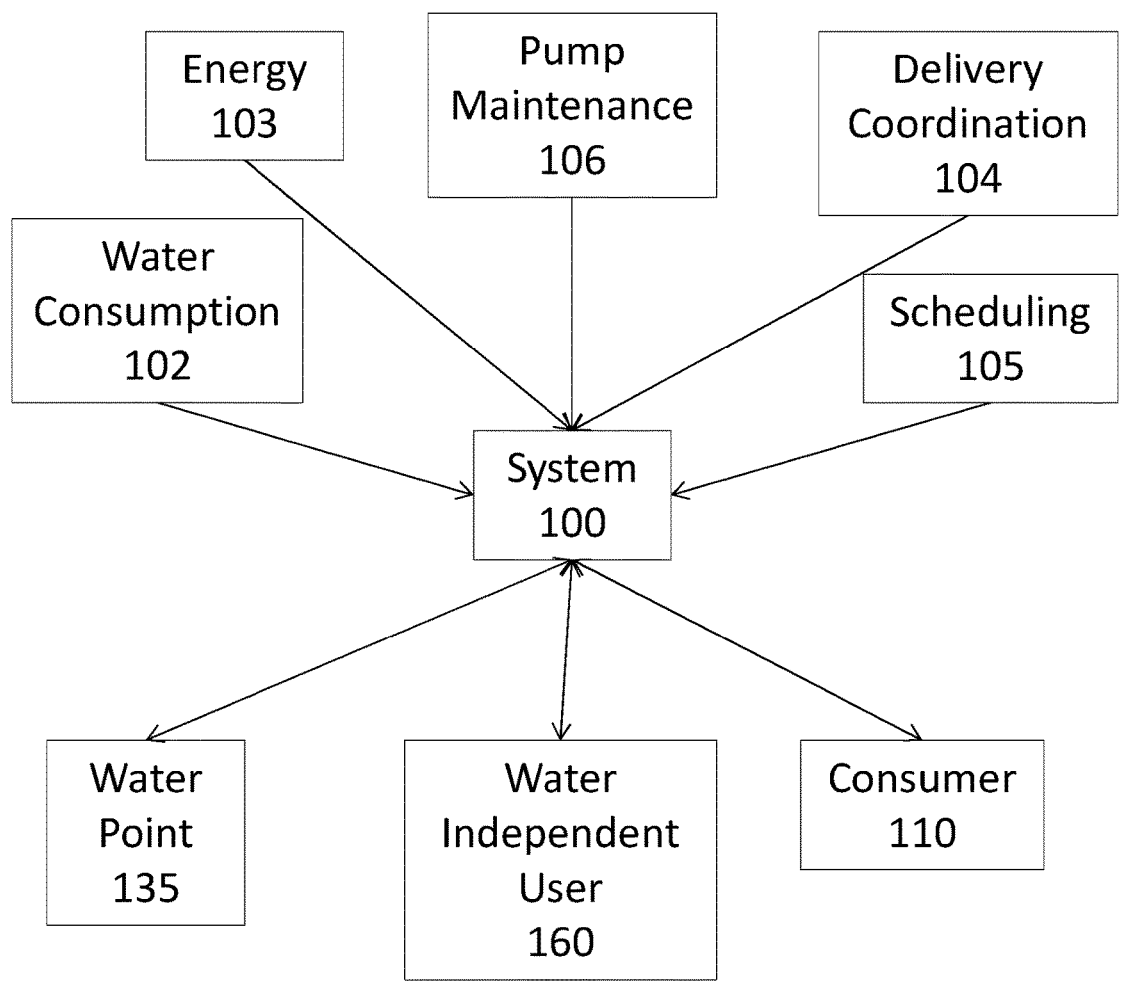
FIG. 3 provides a representation of input and output from a computer system according to an embodiment of the disclosure.

With reference to FIG. 3, System 100 is shown along with various interactions with stakeholders and system modules. Thus, System 100 receives water point data from water points 135. For example, "Smart Tanks" are water tanks equipped with sensors and are able to send tank level data to System 100 via a communications network, such as the Internet or via a cellular network. As mentioned herein, this information can be sent to a cloud-based computing system or to an identifiable server, or combinations thereof. System 100 further includes communications (again via a network) with stakeholders such as Water Independent User 160 and Consumer 110. Consumer 110 is a water dependent user, with examples provided herein, and such may receive analytics and predictions and other information from System 100 in order to have better insights into water usage, how to minimize costs or improve services, and the like. Water Independent User 160 may include individuals and entities that do not use water resources but would be interested in receiving water point data and the analyses/predictions provided by System 100. Such water independent users may include, for example, technicians, policy makers, managers (private and government), and the like. System 100 includes interactions with various modules to provide monitoring services (such as water consumption monitoring 102 and energy consumption monitoring 103). Other modules associated with System 100 provide notification services (such as pump maintenance 106 and delivery coordination 104). Other modules associated with System 100 provide service for planning and scheduling 105, with such being useful for a variety of stakeholders.

In any of the embodiments described herein, the water risk score may be a signal—i.e., it can be used directly to signal a water risk mitigation step (e.g., reduction of water usage via manual or automatic water control systems, increase of water supply via manual or automatic water delivery initiation, or a combination thereof, etc.). This is particularly useful where the water risk score exceeds a predetermined threshold score, which can be identified and modified as necessary and appropriate.

Furthermore, the water risk score (where used as an initiator for the signal) or the notification can be configured to appear on any suitable display screen (including display screens associated with mobile devices, emergency services, service provider computer screens, and the like).

Some example embodiments will now be described in more detail, although these are meant to be representative and not exhaustive or limiting.

In embodiments, a data collection tool or other device (e.g., SMAJI™ or another sensor or meter, or manual readings) is used to continuously monitor and collect water point data (e.g., water level, quality, usage, demography, etc.). SMAJI™ refers to an asset to support the collection, storage and processing of the water points. SMAJI™ provides a range of water users, including homeowners, facility managers, farmers and car wash owners with greater insight on water consumption, the potential for water shortages, pump status and energy consumption related to water usage by collecting and processing distributed water points. Any equivalent to such a sensor/device can be used.

The collected data is uploaded to a computer system according to the invention (including cloud-based systems and individual server-based systems) to create a Digital Aquifer also referred to herein as a Water Database, as described throughout this specification. In embodiments, data coming from multiple sources is aggregated, cleaned, and transformed to standardized water data format in order to form the digital aquifer. Given such digital aquifer, descriptive models are generated to provide real time insights about water usage pattern. Predictive models are generated for water point usage patterns from collected data (streaming data and historical data) and context analysis. Context monitoring is used for existing data (from sources such as, for example, inventory and customer management systems, sales registry, water logbooks, and generated contextual and business relevant data) as well as to generate contextual data and business relevant data. For example, the following could be estimated for a restaurant: the number of clients visiting the restaurant, the scheduled orders for beverages, estimated market demand for agricultural produce, the estimated laundry service usage trend, etc. Existing data and generated business relevant data are used to construct water supply models (e.g., given sources and respective reliability, marginal cost of increasing volumes of water, etc.). Such models are then used in the disclosed methods such as in generating alerts and the like.

In embodiments is the determination of water risk predictors and risk analysis. Water risk predictors are determined by augmenting models, contextual data, and other relevant external data sources depending on the context (e.g., weather, utility prices, restaurant visits, etc.) to generate water risk models and weighted risk predictors. Business impacts (e.g., revenue, profitability number of clients, etc.) are computed and quantified as a function of water usage indicators (e.g., volume, frequency, etc.). Business risk score vectors are computed based on estimated water risk and business impact functions. Optimization techniques are used to minimize computed business risks by using known water information hub and consumer priorities (e.g., number of vendors, vendor proximity, water price, water quality and availability, etc.). A set of possible interventions are generated - these are solutions sets that yield minimal risk.

The methods and systems disclosed herein are useful in helping stakeholders manage and/or maintain water resources at a water point. Generally, the total water supply at a location is the sum of onsite water resources (e.g., boreholes or rainwater harvesting, etc.) and delivered water resources (e.g., municipal water supply, water deliver by vehicle or otherwise, etc.). The systems and methods herein provide water point data that can help consumers and other stakeholders to predict water shortages, understand consumption patterns, predict ecological threats, adjust consumption to match supply, predict marginal costs of supply, etc. For example, it can be determined the conditions that increase the marginal cost of supply, such as: borehole depth; increased potential of poor water quality; declining water levels; and increasing demand.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

Example 1

Figure 4:
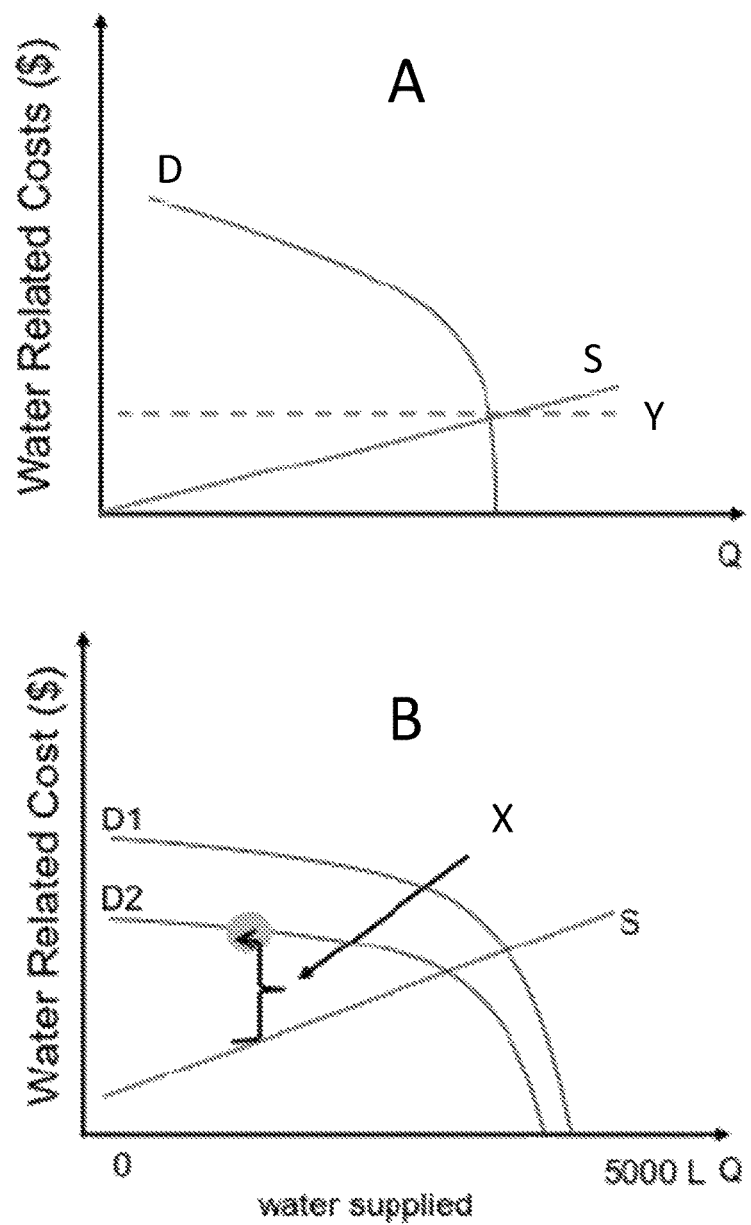
FIG. 4 provides a pair of supply/demand graphs that illustrate certain aspects of water supply and demand.

Water Scarcity Risk Scoring is provided. As seen in FIG. 4, water related costs are equal to the sum of expenses incurred plus opportunities deferred. In the graphs, water related costs versus Quantity (Q) are provided. In Graph A, D refers to a demand curve and S provides a supply curve; "Y" then shows a water related cost that is negligible such that all supply requirements can be met. In contrast, if D>S then there is scarcity. In Graph B, lines "D1" and "D2" show different demand curves, and line "S" shows a supply curve both for varying water related costs ($) versus amounts of water supplied. In the graph, "X" refers to the difference between D2 (a demand from a user) and S, the supplied amount of water. In this case, water supply is less than water demanded. Thus, risk exists until supply increase or demand decreases. A water risk score would reflect the magnitude of cost incurred per user type. Various cases can be inferred from this information.

In the homeowner use case, wherein there is a homeowner with a water storage tank, if no water is available from the tank, the likely response is to order a delivery truck and/or purchase bottled water for drinking. Such activity incurs costs since truck- and bottle-delivered water is more expensive than piped water. As water is increasingly scarce, then, activities with variable economic impact such as laundry, watering the yard, etc. may need to be deferred. Continuous monitoring can help because, for example, when water supply is running low (e.g., nearing a weekly water requirement), low-level mitigation can be incurred or activities deferred.

In the restaurant use case, wherein there is a water storage tank on site for restaurant operations, if no water is available in the tank, cooking becomes nearly impossible and the business closes until water is available. As water becomes increasingly scarce, selective curtailment of activities may occur. This can be problematic in a restaurant setting if unhygienic conditions result.

In the school use case, wherein there is a water storage tank on site for school activities (e.g., boarding pupils requiring daily use), in a scarcity situation there is a reduced ability to service boarding students, kitchen services, etc. This may result in unhygienic conditions, and in extreme result, closure of the school or reduction of enrolment.

What is claimed is:
1. A computer system, comprising:
   a processor; and
   a memory coupled to the processor, the memory configured to store program instructions executable by the processor to cause the computer system to:

receive water point data from a water point sensor about a water point remotely located with respect to the computer system, and store the received water point data in a water point data hub;
receive secondary data from a secondary data source and store the received secondary data in the water point data hub;
correlate the secondary data with the water point data;
generate a water risk score vector from the water point data hub;
generate a notification based on the water risk score vector; and
initiate a water risk mitigation by controlling a cyber-physical system in an Internet of Things (IoT) setting of the computer system when the water risk score vector exceeds a predetermined threshold score.

2. The computer system of claim 1, wherein the computer system is further configured to generate a water point forecast for the water point from the water point data hub, and use the water point forecast to generate the water risk score vector.

3. The computer system of claim 1, wherein the computer system is further configured to receive water point data from a plurality of distributed water point sensors about a plurality of distributed water points each remotely located with respect to the computer system.

4. The computer system of claim 1, wherein prioritization and optimization functions are applied to de-prioritize or re-prioritize the notification based on the water risk score values and predetermined or computed business needs.

5. The computer system of claim 1, wherein the notification is selected from prioritized alert pools and is communicated via a plurality of channels to initiate online and offline services.

6. The computer system of claim 1, wherein the secondary data source is a sensor, a social media network, a website, a manual input device, or a secondary database, and wherein the secondary data is selected from a weather report, a receipt, a social media interaction, a mobile app, a water logbook entry, a website usage report, a health report, and a news feed.

7. The computer system of claim 1, wherein the secondary data is aggregated, interlinked with metadata, and correlated with the water point data based on a correlation factor selected from a time factor and a location factor.

8. The computer system of claim 1, wherein the water point gathering sensor is a device, camera, water meter, or motion sensor.

9. The computer system of claim 1, wherein the water point data is selected from a water level, a water usage rate, and a water quality.

10. The computer system of claim 1, wherein the water point sensor is coupled to an embedded unit configured to dynamically annotate and link the water point data with metadata values.

11. The computer system of claim 1, wherein the water point sensor is coupled to an embedded unit configured to dynamically annotate and link the water point data with metadata values, and wherein the metadata values are predefined or computed, and are optionally captured via sensors, mobile devices, or implicit or explicit user input.

12. The computer system of claim 1, wherein the computer system is further configured to receive water point data from a plurality of water point sensors about a plurality of water points remotely located with respect to the computer system, and wherein the method further comprises generating a water point forecast for the water point from the water point data hub, and using the water point forecast to generate the water risk score vector.

13. The computer system of claim 1, wherein the water point sensor is coupled to an embedded unit configured to dynamically annotate and link the water point data with metadata values, and wherein the computer system is further configured to receive water point data from a plurality of water point sensors about a plurality of water points remotely located with respect to the computer system.

14. A method comprising:
receiving, by a computer system via a network, water point data from a water point sensor about a water point remotely located with respect to the computer system, and storing the received water point data in a water point data hub;
receiving, by the computer system, secondary data from a secondary data source and storing the received secondary data in the water point data hub;
correlating, by the computer system, the secondary data with the water point data;
generating, by the computer system, a water risk score vector from the water point data hub;
generating, by the computer system, a notification based on the water risk score vector; and
generating, by the computer system, a water risk mitigation step to mitigate a water risk by controlling a cyber-physical system in an Internet of Things (IoT) setting of the computer system.

15. The method of claim 14, further comprising generating a water point forecast for the water point based, at least in part, on the received water point data and received secondary data and using the water point forecast to generate the water risk score vector.

16. The method of claim 14, wherein the water point data is dynamically annotated with predefined or computed metadata values by an embedded unit.

17. The method of claim 14, wherein the computer system is further configured to receive water point data from a plurality of distributed water point sensors about a plurality of distributed water points each remotely located with respect to the computer system, and wherein the method further comprises generating a water point forecast for the water point from the water point data hub, and using the water point forecast to generate the water risk score vector.

18. The method of claim 14, wherein the water point sensor is coupled to an embedded unit configured to dynamically annotate and link the water point data with metadata values, and wherein the computer system is further configured to receive water point data from a plurality of water point sensors about a plurality of water points remotely located with respect to the computer system.

19. The method of claim 14, wherein the
water point sensor is located remotely from the processor and in communication with the processor via a network.

20. A method comprising:
receiving, by a computer system via a network, water point data from a water point sensor about a water point remotely located with respect to the computer system, and storing the received water point data in a water point data hub;
receiving, by the computer system, secondary data from a secondary data source and storing the received secondary data in the water point data hub;
correlating, by the computer system, the secondary data with the water point data;

identifying, by the computer system, a water risk from the water point data hub, the water risk exceeding a threshold risk, and generating, by the computer system, a customized water risk signal configured to initiate a water risk mitigation step; and controlling, by the computer system, a cyber-physical system in an Internet of Things (IoT) setting of the computer system as the water risk mitigation step.

\* \* \* \* \*